United States Patent
Winkels et al.

(10) Patent No.: US 6,887,020 B2
(45) Date of Patent: May 3, 2005

(54) DEVICE FOR DEBURRING THE INSIDE OF A LONGITUDINALLY SEAM-WELDED PIPE, AND METHOD FOR ADJUSTING A DEVICE OF THIS TYPE

(75) Inventors: Jörn Winkels, Werl (DE); Bernd Engler, Hamm (DE)

(73) Assignee: Mannesmannröhren-Werke AG, Mülheim (DE)

( * ) Notice: Subject to any disclaimer, the term of this patent is extended or adjusted under 35 U.S.C. 154(b) by 0 days.

(21) Appl. No.: 10/780,546

(22) Filed: Feb. 17, 2004

(65) Prior Publication Data

US 2004/0191023 A1 Sep. 30, 2004

Related U.S. Application Data

(63) Continuation of application No. PCT/DE02/02988, filed on Aug. 9, 2002.

(51) Int. Cl.[7] ................................................. B23D 1/02
(52) U.S. Cl. ........................................ 409/293; 409/299
(58) Field of Search .............................. 409/293, 297, 409/298, 299, 307, 338, 345

(56) References Cited

U.S. PATENT DOCUMENTS

| | | | |
|---|---|---|---|
| 3,331,286 A | * | 7/1967 | Berquist et al. ............ 409/299 |
| 3,759,140 A | * | 9/1973 | Connelly ..................... 409/299 |
| 3,834,275 A | | 9/1974 | Newland |
| 4,710,078 A | * | 12/1987 | Altmeyer et al. ........... 409/233 |
| 5,782,398 A | * | 7/1998 | Graefe ........................ 228/17.5 |

FOREIGN PATENT DOCUMENTS

| | | | | |
|---|---|---|---|---|
| DE | 10 21 319 B | 12/1957 | | |
| DE | 40 20 924 C1 | 7/1991 | | |
| GB | 2 085 780 A | 5/1982 | | |
| JP | 63-99118 | * | 4/1988 | ................. 409/299 |

* cited by examiner

Primary Examiner—Daniel W. Howell
(74) Attorney, Agent, or Firm—Henry M. Feiereisen

(57) ABSTRACT

A device for deburring the inside of a longitudinally seam-welded pipe includes a retention arm secured outside the pipe in the area of the pipe that is not yet closed and having an end zone which is located behind the welding spot. Arranged on the retention arm is a frame part which is tiltable in longitudinal direction of the pipe about a tilt axis and provided with a scraping tool. The tilt axis of the frame part is hereby located, as viewed in advancing direction, behind the scraping point at the end of the frame part. An adjustment mechanism is provided on the forward end of the frame part for adjusting the tilt angle.

9 Claims, 2 Drawing Sheets

DEVICE FOR DEBURRING THE INSIDE OF A LONGITUDINALLY SEAM-WELDED PIPE, AND METHOD FOR ADJUSTING A DEVICE OF THIS TYPE

CROSS-REFERENCES TO RELATED APPLICATIONS

This application is a continuation of prior filed copending PCT International application No. PCT/DE02/02988, filed Aug. 9, 2002, which designated the United States and on which priority is claimed under 35 U.S.C. §120, the disclosure of which is hereby incorporated by reference.

This application claims the priority of German Patent Application, Serial No. 101 40 018.7, filed Aug. 15, 2001, pursuant to 35 U.S.C. 119(a)–(d), the disclosure of which is incorporated herein by reference.

BACKGROUND OF THE INVENTION

The present invention relates, in general, to a device for deburring the inside of longitudinally seam-welded pipes, and to a method for adjusting a device of this type.

German Pat. No. DE 40 20 924 C1 discloses a device for generating short chips during deburring the inside of longitudinally seam-welded pipes. This known device includes a scraping tool disposed within a longitudinally seam-welded pipe behind the welding spot and fixed by means of a carrier frame and a forked guide rod which is provided with a retention arm secured outside the pipe in front of the welding spot in the area of the pipe that is not yet closed. Disposed in the upper part of the carrier frame are two rotatably supported follower rollers in front of and behind the scraping point. The carrier frame is tiltably supported by means of lateral bearing bolts in recesses of lateral flanges of the guide rod, whereby the tilt axis extends between both follower rollers.

Practice has shown that the scraping results attained by this conventional device have been unsatisfactory because of instable behavior of the device and the fact that the knife height, i.e. the height by which the knife juts out beyond the circumference of the follower roller, cannot be adjusted, without shutting down the device.

It would therefore be desirable and advantageous to provide an improved device for deburring the inside of longitudinally seam-welded pipes, to obviate prior art shortcomings and to allow a sensitive adjustment of the scraping knife in an optimum manner during operation, regardless of the length of the scraper arm. It would also be desirable and advantageous to provide a method for adjusting a device of this type.

SUMMARY OF THE INVENTION

According to one aspect of the present invention, a device for deburring the inside of a longitudinally seam-welded pipe includes a retention arm secured outside a longitudinally seam-welded pipe in an area of the pipe that has not yet been closed, and having an end zone which is located behind a welding spot, a frame part arranged in the end zone of the retention arm and constructed for tilting longitudinally in direction of the pipe about a tilt axis by a tilt angle, an adjustment mechanism, arranged on a leading end of the frame part, for adjusting the tilt angle of the frame part, and a scraping tool supported by the frame part and bearing against an inside surface of the pipe at a scraping point, for removing burrs and discharge thereof via a chip removal slot in the frame part, wherein the tilt axis is located, as viewed in an advance direction of the pipe, behind the scraping point at a trailing end of the frame part.

According to another feature of the present invention, the adjustment mechanism may be constructed to include a hydraulically controllable adjusting cylinder. In this way, it is possible to reproducible change the position of the scraping knife by about 0.1 mm. Such a fine graduation cannot be realized by a slanted disposition of a scraper arm as described conventionally.

According to a further feature of the invention, the end zone of the retention arm can be configured as fork having a pair of parallel prongs, with the frame part arranged between the prongs and having opposite longitudinal sides, with each of the longitudinal sides having a pin extending in the tilt axis, wherein the pin of one longitudinal side is rotatably supported on a top surface of one of the prongs, and the pin of the other one of the longitudinal sides is rotatably supported on-a top surface of the other one of the prongs.

According to another feature of the present invention, a follower roller may be rotatably supported by the frame part in front of the scraping point, as viewed in advancing direction. Suitably, the follower roller is disposed between the scraping tool and the adjustment mechanism.

According to another aspect of the present invention, a method for adjusting a device for deburring the inside of a longitudinally seam-welded pipe includes the steps of adjusting the retention arm and thus the scraping tool mounted on the frame part, and aligning the adjustment mechanism to a mid-position at an adjustment in a plus and minus range.

Adjustment of the tilt angle is thus realized by shifting the adjustment mechanism to assume a mid-position, after proper alignment of the retention arm and thus the scraping tool that is connected with the frame part, wherein the adjustment is realized in the plus and minus range. The adjustment relates hereby to a correction of the previously adjusted position of the scraping tool in the longitudinal plane, wherein the alignment also includes the positional adjustment in the transverse plane and about the own longitudinal axis in dependence on the ratio of wall thickness to diameter of the pipe being welded. In other words: a change of the tilt angle of the frame part is accompanied by a change of the engagement state of the fixed scraping knife to realize a best possible scraping result on the inside of the pipe. Not only is hereby the height, by which the scraping knife juts out beyond the follower roller, slightly changed but also a significant change of the cutting angle is realized.

A device according to the present invention for deburring the inside of pipes is also applicable when one or more support rollers are arranged on the underside of the retention arm.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
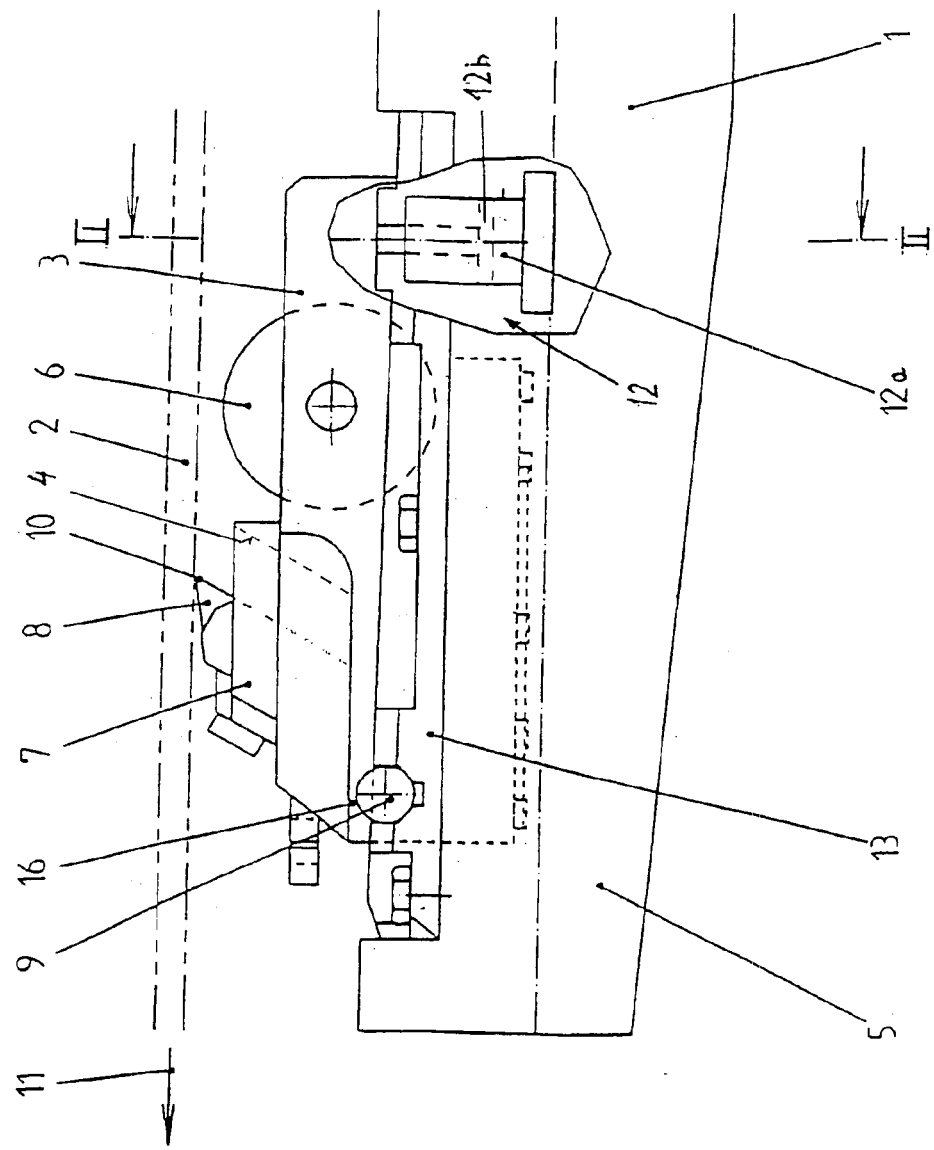
FIG. 1 is a longitudinal view, partly broken up, of a device for deburring the inside of longitudinally seam-welded pipes, in accordance with the present invention and showing the area in the cutting tool zone.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a longitudinal view, partly broken up, of a device for deburring the inside of a longitudinally seam-welded pipe 2 in accordance with the present invention and showing the area in the cutting tool zone. The pipe 2 is movable in a transport direction as indicated by arrow 11. The device includes a retention arm 1, shown here only partially and secured outside the pipe 2 in the area of the pipe 2 that is not yet closed. Mounted to the retention arm 1 is a frame part 3 which is tiltable in longitudinal direction of the pipe 2 about a tilt axis 9. The retention arm 1 has a rearward end zone which is configured in the form of a fork located behind the welding spot. In the following description, the term "rearward" will denote a direction toward those portions of the device which appear on the left of FIG. 1, while the term "forward" will denote the opposite location or direction.

Figure 2:
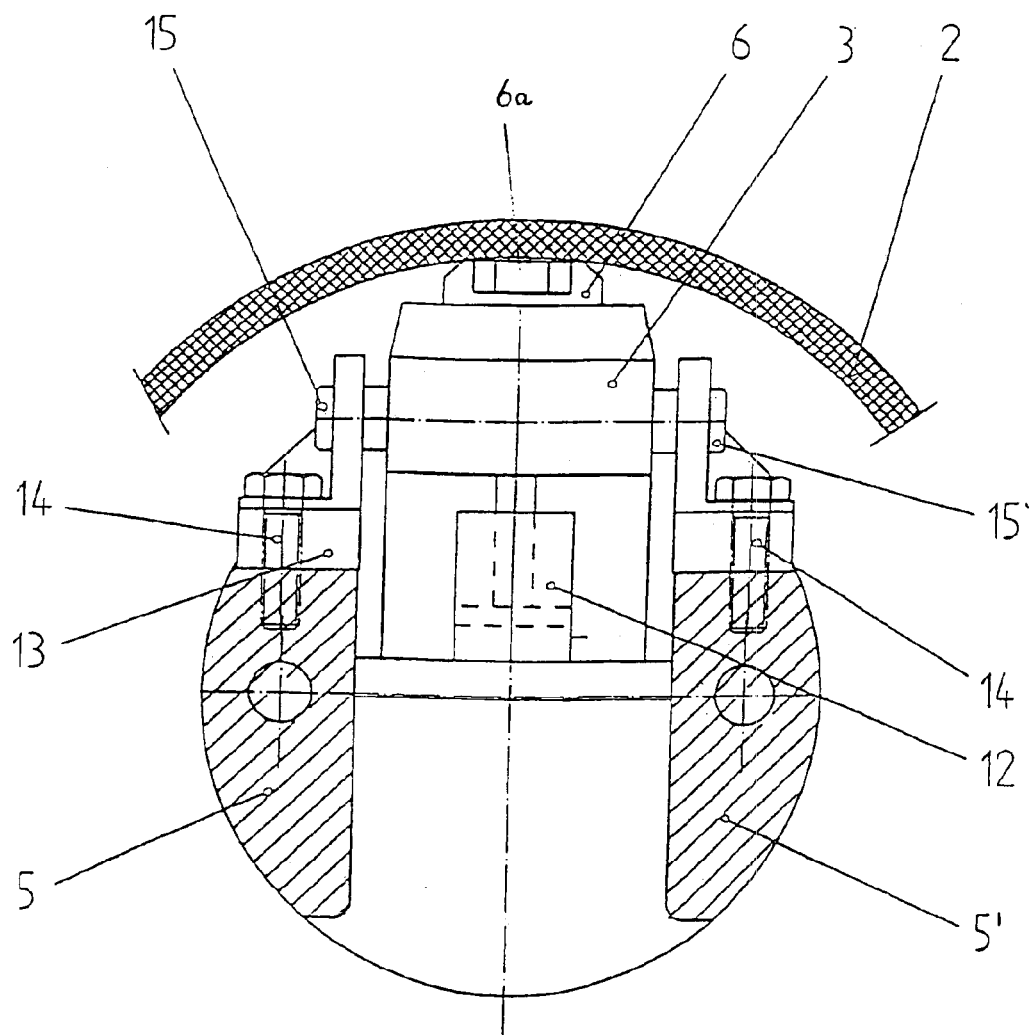
FIG. 2 is a cross sectional view of the device, taken along the line II—II in FIG. 1.

As can be seen from FIG. 2, which is a cross sectional view of the device, taken along the line II—II in FIG. 1, the fork includes two parallel fork pieces 5, 5' between which the tiltable frame part 3 is positioned. The tiltable frame part 3 includes a rotatably supported follower roller 6 and a holding device 7 for a scraping knife 8 and is provided with a slanted chip removal slot, as indicated by dashed line 4. During scraping operation, the follower roller 6 bears upon the inside of the pipe 2 to urge the device against the pipe 2. In this way, the device is prevented from wobbling as a result of uneven forces to which the scraping knife 10 is subjected. The follower roller 6 is hereby constructed to allow a passage of a burr or weld bead that has not been scraped off through a recess 6a of the follower roller 6, as shown in FIG. 2.

As viewed in advancing direction, the tilt axis 9 of the frame part 3 is located, behind a scraping point 10 at the end of the frame part 3.

In order to be able to sensitively change the tilt angle of the frame part 3 in accordance with the invention, a hydraulically controllable adjustment mechanism, generally designated by reference numeral 12, is disposed in a forward end zone of the frame part 3 and includes an adjusting cylinder 12a and a piston arrangement 12b received in the cylinder 12a and acting on a confronting surface of the frame part 3. Structure and operation of such an adjustment mechanism are generally known so that a detailed description thereof is omitted for the sake of simplicity. As an alternative to the arrangement of the adjusting mechanism, it is also possible to modify the tilt angle by arranging other mechanisms such as a toothed rack, an adjusting spindle, or the like.

The adjusting mechanism 12 is configured to effect adjustment of about ±1 mm. In order to account for wear of the scraping knife 10 or slight shifts of the device, the adjustment mechanism 12 is calibrated or pre-aligned in the plus or minus range before each deburring operation so as to position the scraping knife 10 in optimum disposition which is commensurate with a mid-position of the adjustment mechanism 12. The compensation of small variations can be carried out during operation, and a shutdown of the device is only required, when the scraping knife 10 is fully worn out and needs to be replaced.

Although not shown in detail, the retention arm 1 may be constructed to allow calibration or pre-alignment thereof in order to properly position the scraping knife 10. Hereby, the rearward part of the retention arm 1 is supported in the device in such a manner as to allow an adjustment of the retention arm 1 in all degrees of freedom. In other words, the retention arm 1 may be moved upwards, downwards, to the right or to the left as well pivoted about its own longitudinal axis. The adjustment of the retention arm 1 is hereby implemented in dependence on the ratio between wall thickness of the pipe 1 and diameter of the pipe 2, whereby this ratio is a determinative factor for the force applied upon the scraping knife 10.

FIG. 2 shows the securement of a frame attachment 13 by means of screws 14 upon the surface of the flanges 5, 5'. The frame part 3 is provided on its longitudinal sides with pins 15, 15' which extend respectively to the right and to the left. These pins 15, 15' are insertable in a groove 16 of the frame attachment 13 so that the pins 15, 15' are able to rotate within the groove 16.

The embodiment illustrated in FIGS. 1 and 2 can be modified by supporting the underside of the retention arm 1 with one or more support rollers.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A device for deburring the inside of a longitudinally seam-welded pipe, comprising:
    a retention arm secured outside a longitudinally seam-welded pipe in an area of the pipe that has not yet been closed, said retention arm having an end zone which is located behind the welding spot;
    a frame part arranged in the end zone of the retention arm and constructed for tilting longitudinally in direction of the pipe about a tilt axis by a tilt angle, an adjustment mechanism, arranged on a leading end of the frame part, for adjusting the tilt angle of the frame part; and
    a scraping tool supported by the frame part and bearing against an inside surface of the pipe at a scraping point, for removing burrs and discharge thereof via a chip removal slot in the frame part;
    wherein the tilt axis is located, as viewed in an advance direction of the pipe, behind the scraping point at a trailing end of the frame part.

2. The device of claim 1, wherein the end zone of the retention arm is configured as fork having a pair of parallel prongs, with the frame part arranged between the prongs and having opposite longitudinal sides, with each longitudinal sides having a pin extending in the tilt axis, wherein the pin of one longitudinal side is rotatably supported on a top surface of one of the prongs, and the pin of the other one of the longitudinal sides is rotatably supported on a top surface of the other one of the prongs.

3. The device of claim 1, and further comprising a follower roller rotatably supported by the frame part in front of the scraping point, as viewed in advancing direction.

4. The device of claim 3, wherein the follower roller is disposed between the scraping tool and the adjustment means.

5. The device of claim 1, wherein the adjustment means includes a hydraulically controllable adjusting cylinder.

6. The device of claim 1, wherein the adjustment means is constructed to realize an adjustment of the scraping tool by about 0.1 mm.

7. A method for adjusting a device of claim 1 for deburring the inside of a longitudinally seam-welded pipe, comprising the steps of:

adjusting the retention arm and thus the scraping tool mounted on the frame part; and aligning the adjustment means to a mid-position at an adjustment in a plus and minus range.

8. The method of claim 7, wherein the adjustment of the retention arm includes a positional adjustment in a longitudinal plane, in a transverse plane, and about a longitudinal axis of the retention arm, in dependence on a ratio of wall thickness to diameter of the pipe being welded.

9. The method of claim 8, wherein the aligning step is realized to correct a preset position of the scraping tool in the longitudinal plane.

* * * * *

UNITED STATES PATENT AND TRADEMARK OFFICE
CERTIFICATE OF CORRECTION

| | |
|---|---|
| PATENT NO. | : 6,887,020 B2 |
| DATED | : May 3, 2005 |
| INVENTOR(S) | : Winkels et al. |

It is certified that error appears in the above-identified patent and that said Letters Patent is hereby corrected as shown below:

<u>Title page,</u>
Insert Item -- [30]   Foreign Application Priority Data
   August 15, 2001 (DE)   101 40 018.7 --.

Signed and Sealed this

Sixteenth Day of August, 2005

JON W. DUDAS
*Director of the United States Patent and Trademark Office*